(12) United States Patent
Kress et al.

(10) Patent No.: US 7,530,773 B2
(45) Date of Patent: May 12, 2009

(54) CARRIER SYSTEM FOR RECEIVING COMPONENTS

(75) Inventors: André Kress, Syke (DE); Juergen Wieck, Delmenhorst (DE); Guenter Vogg, Bremen (DE)

(73) Assignee: Airbus Deutschland GmbH (DE)

( * ) Notice: Subject to any disclaimer, the term of this patent is extended or adjusted under 35 U.S.C. 154(b) by 555 days.

(21) Appl. No.: 11/227,619

(22) Filed: Sep. 15, 2005

(65) Prior Publication Data

US 2006/0065781 A1 Mar. 30, 2006
US 2007/0295861 A9 Dec. 27, 2007

Related U.S. Application Data

(60) Provisional application No. 60/609,999, filed on Sep. 15, 2004.

(30) Foreign Application Priority Data

Sep. 15, 2004 (DE) .................. 10 2004 044 653

(51) Int. Cl.
*B60P 7/08* (2006.01)
(52) U.S. Cl. .............. 410/92; 410/46; 410/80; 193/35 C
(58) Field of Classification Search ........... 410/46, 410/77, 80, 92; 244/118.1, 137.1; 193/35 C, 193/35 MD, 37; 414/536; 248/500, 503
See application file for complete search history.

(56) References Cited

U.S. PATENT DOCUMENTS

| 2,743,684 | A | 5/1956 | Elsner |
| 3,388,437 | A | 6/1968 | Stoddard |
| 4,929,133 | A | 5/1990 | Wiseman |
| 5,033,601 | A | 7/1991 | Huber |
| 6,039,288 | A | 3/2000 | Huber et al. |
| 6,125,984 | A | 10/2000 | Huber et al. |
| 6,726,416 | B2 * | 4/2004 | Shoup .................. 410/46 |
| 2004/0216982 | A1 | 11/2004 | Huber et al. |

FOREIGN PATENT DOCUMENTS

| DE | AS-12 12 877 | 3/1966 |
| DE | OS-22 38 296 | 2/1974 |
| DE | 34 21 345 | 12/1985 |
| DE | 39 27 560 | 3/1991 |
| DE | 197 12 278 | 9/1998 |
| DE | 197 20 224 | 10/1998 |
| DE | 199 00 839 | 7/2000 |
| DE | 102 04 024 | 9/2003 |
| EP | 0 864 489 | 9/1998 |
| GB | 1038767 | 8/1966 |
| GB | 2346928 | 8/2000 |
| WO | WO-98/42566 | 10/1998 |
| WO | WO-2004/031033 | 4/2004 |

* cited by examiner

*Primary Examiner*—Stephen Gordon
(74) *Attorney, Agent, or Firm*—Lerner, David, Littenberg, Krumholz & Mentlik, LLP

(57) ABSTRACT

A carrier system for receiving a component comprises a bottom plate integrated in the design of a conventional ball mat in order to introduce forces, e.g., acting on the ball mat, into the structure, for example an aircraft structure.

6 Claims, 3 Drawing Sheets

CARRIER SYSTEM FOR RECEIVING COMPONENTS

CROSS-REFERENCE TO RELATED APPLICATIONS

This application claims the benefit of the filing date of U.S. Provisional Patent Application No. 60/609,999 filed Sep. 15, 2004, the disclosure of which is hereby incorporated herein by reference.

BACKGROUND OF THE INVENTION

The loading section of an airplane cargo space is a very sensitive area in light of its omni-directional function. Other than the fact that ULDs (unit load devices) are transported from a transverse direction in a longitudinal direction or vice versa, the stresses caused by a transfer from the loader into the cargo space must also be absorbed.

For this purpose, the prior art uses ball elements that are incorporated into so-called ball mats and intended to form as enclosed a surface as possible, which is only interrupted by necessary cargo components, such as locks or PDUs (power drive units).

The installation of additional ULD types requires the incorporation of other cargo components, making it necessary to cut the ball mats. Since this produces a significant change, additional cargo component options are very difficult to retrofit at the customer.

Further, exposing the structure to forces, e.g., from locking components, involves a considerable structural outlay.

SUMMARY OF THE INVENTION

The invention relates to a carrier system for receiving components, in particular a combined carrier system for receiving locking components, guiding elements and transport elements for a cargo loading system in an airplane cargo space.

In order to accommodate a component, e.g., a locking component, guiding component or transport component, the structure according to an exemplary embodiment of the invention comprises a bottom plate, to which a member for receiving the component is secured. An attachment device may be fixedly connected to the bottom plate (mill frame bottom plate), so that forces acting on the component are guided into the structure.

According to an exemplary embodiment of the invention, a carrier system is created that makes it possible to easily incorporate additional cargo components, e.g., locking components, into a cargo loading system after the fact, wherein high forces acting on the locking components can be introduced into the structure.

According to an exemplary embodiment of the invention, a structure for receiving a component may be provided which comprises a bottom plate integrated in the design of a conventional ball mat in order to introduce forces, e.g., acting on the ball mat, into the structure.

In a further exemplary embodiment of the invention, the attachment device has a base (for instance a housing or a reception) rigidly connected with the bottom plate. The base may comprise an inner thread that can accommodate a screw to secure the component or the carrier system to the structure.

The attachment device may contain a spring, which exerts a force on the screw as the screw is screwed into the base or into the housing.

In an exemplary embodiment of the invention, the base of the attachment device is riveted to the bottom plate. The base or the housing can also be welded to the bottom plate. The member that accommodates a component may be a milled part according to a further exemplary embodiment of the invention.

The design of the structure according to an exemplary embodiment of the invention is based on an existing BM (ball mat) technology, and is adapted for absorbing Y forces. According to an exemplary embodiment of the invention, the conventional BM technology or design is modified in such a way as to replace the bottom sheet including supporting strip with a milling frame with reinforced ribs. A C profile and a BM profile are riveted to this bottom group, for example, and an enclosed surface is generated with cover sheets.

According to an exemplary embodiment of the invention, the known BM technology does not require a structural change. Also achieved are a smaller number of parts, and hence lower storage costs at the customer.

BRIEF DESCRIPTION OF THE DRAWINGS

An exemplary embodiment of the invention will be described below with reference to the attached drawings. Shown on.

DETAILED DESCRIPTION

Identical parts are denoted with the same reference numbers in the figures.

Figure 1A:
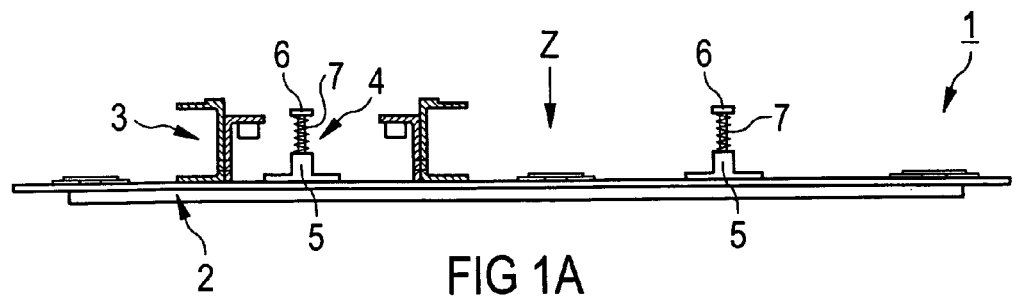
FIG. 1A is a partial side view of a carrier system according to an exemplary embodiment of the invention.

FIG. 1A shows a partial side view of a carrier system (which may also be denoted as a structure) 1 according to an exemplary embodiment of the invention.

The carrier system 1 according to the invention comprises a bottom plate 2. C-profiles 3 are secured on this bottom plate 2 by means of rivets (not shown) according to the preferred exemplary embodiment. The C-profile 3 is a milled part and serves to receive locking/guiding components (not shown on FIG. 1A).

FIG. 1A shows an attachment device 4 containing a base or housing 5. The housing 5 is designed in such a way that a screw 6 can be screwed into the housing 5. As shown on FIG. 1A, a spring 7 is secured to the screw 6, thereby generating an elastic force while turning the screw 6 into the housing 5 that counters the screwing direction.

Turning the screw 6 into the base 5 screws a BM (ball mat, not shown on FIG. 1A) to the bottom plate 2. As a result, forces acting on the BM are diverted into the carrier system 1 via the bottom plate 2.

Figure 1B:
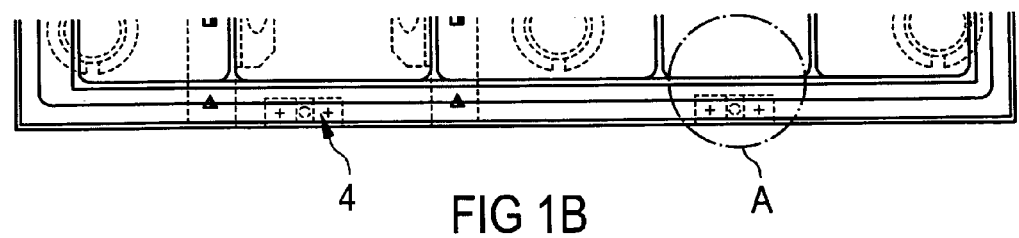
FIG. 1B is a partial view of the structure according to FIG. 1A from above.

FIG. 1B shows a partial view of the carrier system 1 according to FIG. 1A from above. As shown on FIG. 1B, only two attachment devices 4 on one side of the carrier system 1 are necessary.

Figure 2A:
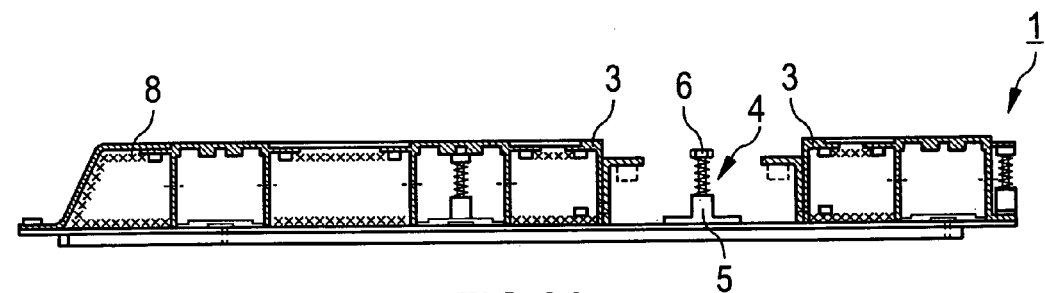
FIG. 2A is another partial side view of the carrier system according to an exemplary embodiment of the invention.

FIG. 2A shows another partial view of the carrier system 1 according to the preferred exemplary embodiment of the invention. FIG. 2A shows a bottom plate 2, to which C-profiles are riveted. The C-profiles in turn serve to accommodate components, e.g., locking components, guiding components, wherein forces acting on the profiles are introduced into the carrier system 1. None of the mentioned components are shown on FIG. 2A to provide a better overview.

A BM is screwed (attached) to the structure 1 or to an aircraft structure by means of the screw 6 of the attachment device 4 by turning it into the base 5 of the attachment device 4.

FIG. 2A also shows cover sheets 8 which serve to produce an enclosed surface structure.

Figure 2B:
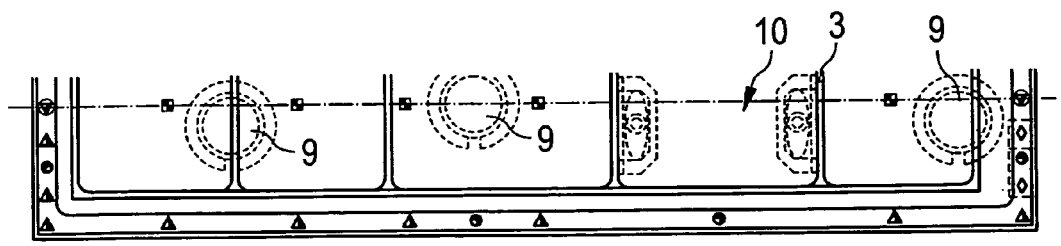
FIG. 2B is a partial view of the carrier system according to FIG. 2A from below.

FIG. 2B shows a partial view of the carrier system according to FIG. 2A from below. As indicated in the areas 9 on FIG. 2B, ball elements (ball transfer units) are employed there, for example. As shown on FIG. 2B, a latching or locking component, for example, can be incorporated in an area 10. The locking component is preferably inserted in, latched in or riveted to the C-profiles.

Figure 3:
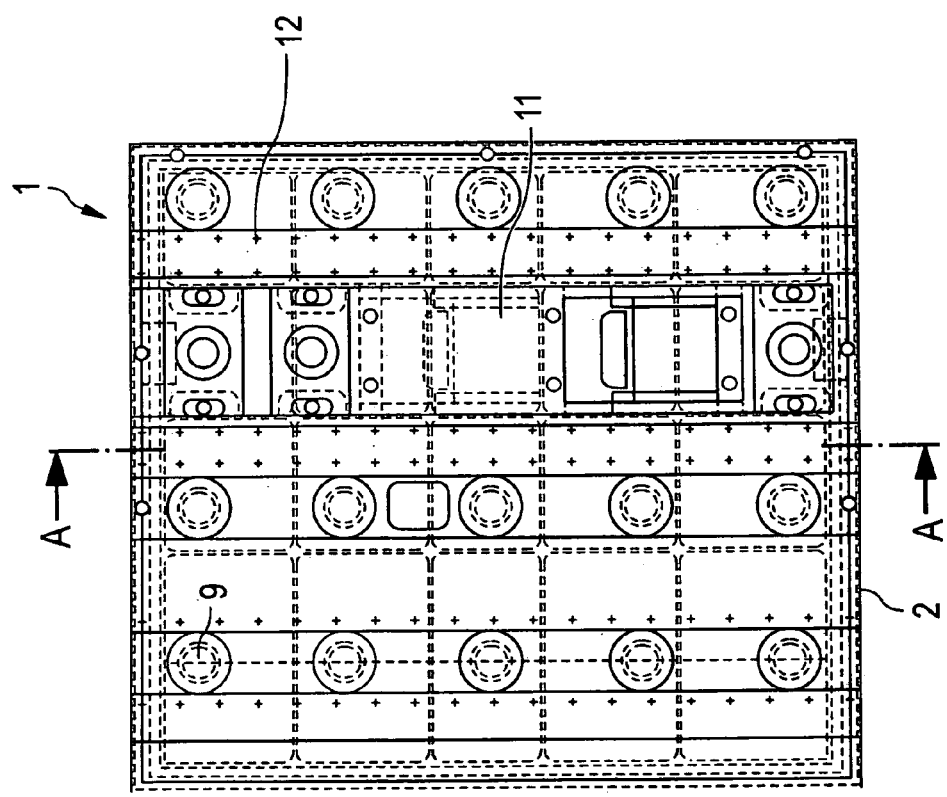
FIG. 3 is a general view of a carrier system according to an exemplary embodiment of the invention.

FIG. 3 shows a general view of a carrier system 1 according to the preferred exemplary embodiment, wherein the bottom plate 2, e.g., a milled part, has essentially a square design. The geometry of the milled part is dependent on the mounting conditions and is optional.

The carrier system 1 comprises a plurality of transport elements (e.g., ball elements, so-called BTUs (ball transfer units)) 9. Two locking components 11 are shown in an area 10 of the carrier system 1.

Figure 4:
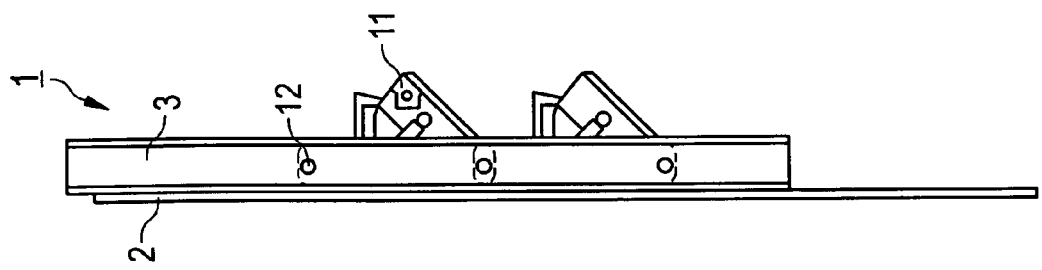
FIG. 4 is a cross sectional view along the line A-A in FIG. 3.

As illustrated in FIG. 4, which shows a cross sectional view along the line A-A in FIG. 3, the locking components 11 are also latched into the C-profiles.

Figure 5:
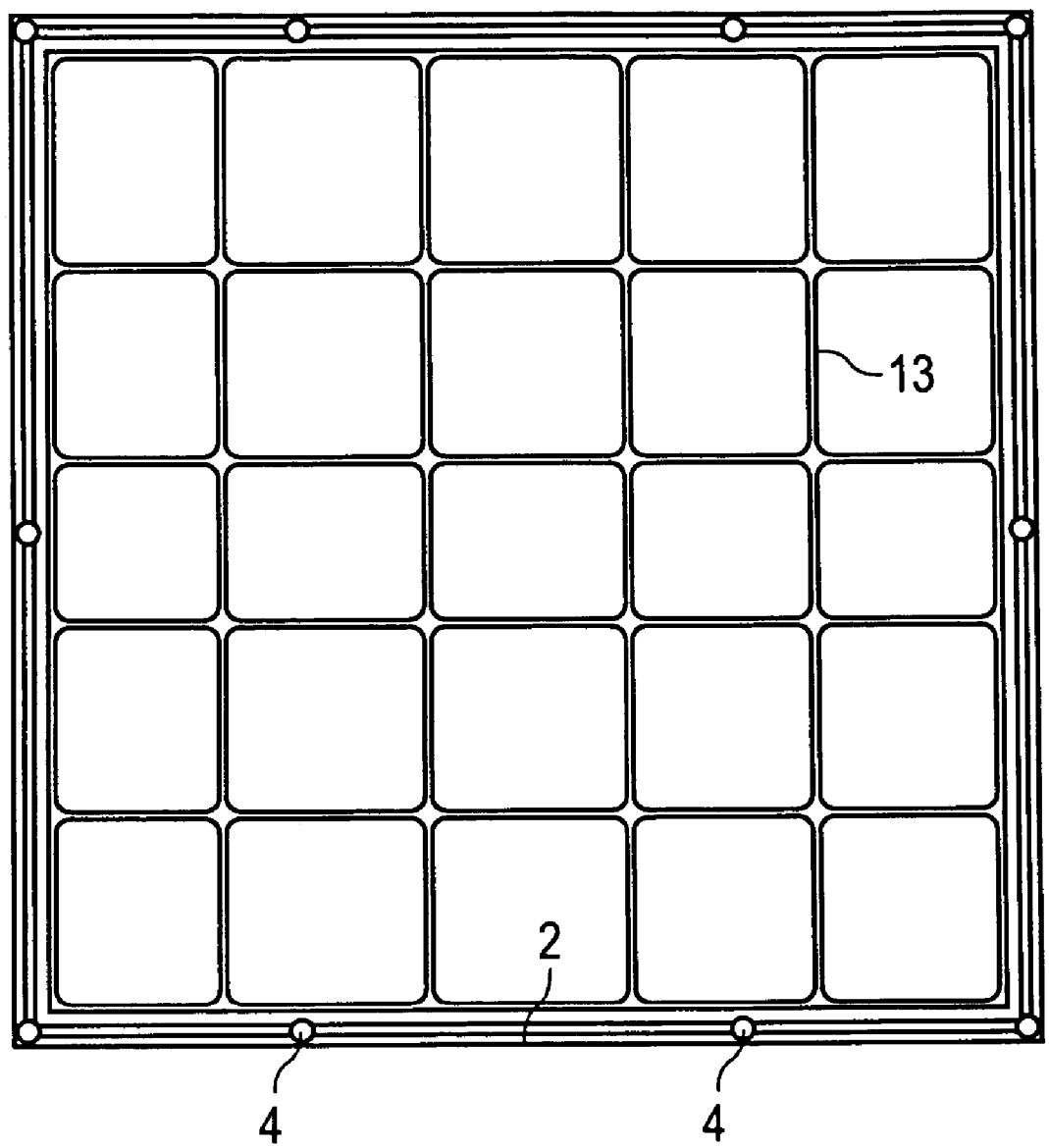
FIG. 5 is a view of the mill frame bottom plate according to an exemplary embodiment of the invention from below.

FIG. 5 shows the bottom plate (mill frame bottom plate) 2 from below. In this exemplary embodiment, the bottom plate 2 is designed as a frame, which is a milled part. The bottom plate 2 comprises a plurality of stiffening members braces or cross beams 13, which essentially divide the bottom plate 2 into squares. The edge of the bottom plate 2 is adapted for receiving the attachment device 4, as described above.

Although the invention was described above with reference to a preferred exemplary embodiment, it goes without saying that modifications can be introduced without departing from the scope of protection of the invention, as long as a conventional BM design is adapted to integrate a milled carrier frame (bottom plate) in order to introduce high forces, e.g., that act on the locking components, into the structure.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE NUMERALS

1 Carrier system
2 Bottom plate
3 C-profile
4 Attachment device
5 Housing
6 Screw
7 Spring
8 Cover sheet
9 Ball element (area)
10 Locking component area
11 Locking component
12 Rivets
13 Stiffening members Although the invention herein has been described with reference to particular embodiments, it is to be understood that these embodiments are merely illustrative of the principles and applications of the present invention., It is therefore to be understood that numerous modifications may be made to the illustrative embodiments and that other arrangements may be devised without departing from the spirit and scope of the present invention as defined by the appended claims.

The invention claimed is:

1. A carrier system for receiving a component, the carrier system comprising
   a bottom plate;
   a member secured to the bottom plate for receiving the component;
   an attachment device rigidly connected with the bottom plate to secure the component in such a manner that forces acting on the component are guided into the carrier system;
   wherein the attachment device comprises a base which is rigidly connected with the bottom plate, into which base a screw is screwable in order to secure the component or the carrier system to an aircraft structure; and
   wherein the attachment device comprises a spring, which generates an elastic force when screwing in the screw counteracting a screwing direction of the screw.

2. Carrier system according to claim 1, wherein the base of the attachment device is riveted to the bottom plate.

3. Carrier system according to claim 1, wherein the member is a milled part for receiving the component, and is riveted to the bottom plate.

4. Carrier system according to claim 3, wherein the milled part has a C-profile for receiving at least one of the group consisting of locking components and guiding elements.

5. Carrier system according to claim 4, wherein the milled part has a ball mat-profile for receiving transport elements.

6. Carrier system according to claim 1, further comprising a cover sheet to form an enclosed surface of the carrier system.

* * * * *